US007113937B2

(12) United States Patent
Goode et al.

(10) Patent No.: US 7,113,937 B2
(45) Date of Patent: *Sep. 26, 2006

(54) SYSTEMS, METHODS, AND COMPUTER PROGRAM PRODUCTS TO IMPROVE PERFORMANCE OF PORTED APPLICATIONS, SUCH AS A DATABASE, OPERATING ON UNIX SYSTEM SERVICES FOR THE OS/390

(75) Inventors: David Harold Goode, San Jose, CA (US); William Earl Malloy, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 563 days.

This patent is subject to a terminal disclaimer.

(21) Appl. No.: 10/033,809

(22) Filed: Dec. 18, 2001

(65) Prior Publication Data

US 2003/0115221 A1    Jun. 19, 2003

(51) Int. Cl.
  *G06F 17/30* (2006.01)
(52) U.S. Cl. ............................. 707/2; 710/24
(58) Field of Classification Search ................ 707/200, 707/100, 101, 2; 710/5, 6, 24; 711/112; 719/328

See application file for complete search history.

(56) References Cited

U.S. PATENT DOCUMENTS

| | | | |
|---|---|---|---|
| 4,408,273 A | 10/1983 | Plow | 364/200 |
| 5,097,533 A | 3/1992 | Burger et al. | 395/500 |
| 5,337,412 A | 8/1994 | Baker et al. | 395/275 |
| 5,386,525 A | 1/1995 | Noack | 395/400 |
| 5,522,054 A | 5/1996 | Gunlock et al. | 711/112 |
| 5,675,781 A | 10/1997 | Duncan et al. | 395/608 |
| 5,813,005 A | 9/1998 | Tsuchida et al. | 707/10 |
| 5,819,310 A | 10/1998 | Vishlitzky | 711/114 |
| 5,870,587 A | 2/1999 | Danforth et al. | 395/500 |
| 5,901,319 A | 5/1999 | Hirst | 395/710 |
| 5,915,131 A | 6/1999 | Knight et al. | 395/892 |
| 5,925,109 A | 7/1999 | Bartz | 710/14 |
| 5,930,824 A | 7/1999 | Anglin et al. | 711/162 |
| 5,978,815 A | 11/1999 | Cabrera et al. | 707/204 |
| 5,999,930 A | 12/1999 | Wolff | 707/8 |
| 6,012,104 A | 1/2000 | Van Nguyen et al. | 710/8 |
| 6,044,415 A | 3/2000 | Futral et al. | 710/33 |
| 6,098,149 A | 8/2000 | Ofer et al. | 711/112 |

(Continued)

FOREIGN PATENT DOCUMENTS

EP    0756228    9/1998

OTHER PUBLICATIONS

W. Kohler, *EMC Information Sharing: Direct Access to MVS Data from UNIX and NT*, Proc. of the 1999 ACM SIGMOND Int. Conf. on Management of Data Jun. 1-3, 1999, Philadelphia, Pennsylvania, SIGMOND Record, vol. 28, Issue 2, Jun. 1999.

(Continued)

*Primary Examiner*—Uyen Le
(74) *Attorney, Agent, or Firm*—Megan M Sugiyama; Christine H. Smith

(57) ABSTRACT

Systems, methods, and computer program products for improving the performance of computer-implemented I/O operations for complex applications, such as databases. Applications that are ported to the IBM OS/390 UNIX System Services may be enhanced by the present invention to improve I/O performance. That is, the present invention may be implemented by augmenting general-purpose I/O access features with specialized I/O access operations that are tailored to enhance I/O access performance for complex applications, such as databasbes, on the IBM OS/390 UNIX System Services.

33 Claims, 7 Drawing Sheets

U.S. PATENT DOCUMENTS

| | | |
|---|---|---|
| 6,108,653 A | 8/2000 | Pereira .......................... 707/7 |
| 6,112,257 A | 8/2000 | Mason, Jr. et al. ........... 710/18 |
| 6,122,685 A | 9/2000 | Bachmat ..................... 710/74 |
| 6,141,707 A | 10/2000 | Halligan et al. .............. 710/36 |
| 6,167,459 A | 12/2000 | Beardsley et al. .............. 710/3 |
| 6,170,023 B1 | 1/2001 | Beardsley et al. ............ 710/36 |
| 6,182,158 B1 | 1/2001 | Kougiouris et al. ........ 709/328 |
| 6,185,638 B1 | 2/2001 | Beardsley et al. ............ 710/36 |
| 6,192,359 B1 | 2/2001 | Tsuchida et al. ................ 707/4 |
| 6,199,117 B1 | 3/2001 | Cox et al. ................... 709/328 |
| 6,209,059 B1 | 3/2001 | Ofer et al. ................... 711/114 |
| 6,216,211 B1 | 4/2001 | McBrearty et al. ......... 711/162 |
| 6,240,467 B1 | 5/2001 | Beardsley et al. .............. 710/5 |
| 6,301,605 B1 * | 10/2001 | Napolitano et al. ......... 709/201 |
| 6,301,640 B1 | 10/2001 | Barve et al. ................. 711/113 |
| 6,502,205 B1 | 12/2002 | Yanai et al. .................... 714/7 |
| 6,671,767 B1 | 12/2003 | Furuumi et al. ............. 711/100 |

OTHER PUBLICATIONS

A. Smith, et al., *A Versatile, Source-Independent System for Digital Data Management*, EOS Transactions, American Geophysical Union, vol. 67, No. 15, Apr. 15, 1986.

Martin et al., *Performance Analysis of the VSAM Method*, Angewandte Informatik, vol. 27, No. 8, pp. 334, 342, Aug. 1985. (German Translation).

M. Simpson, *Using APL As a Preprocessing Selector from Large VSAM Files*, Conference Proc. APL 84, ACM, Finland Jun. 11-15, 1984. APL Quote Quad, vol. 14, No. 4, pp. 297-302, Jun. 1984.

* cited by examiner

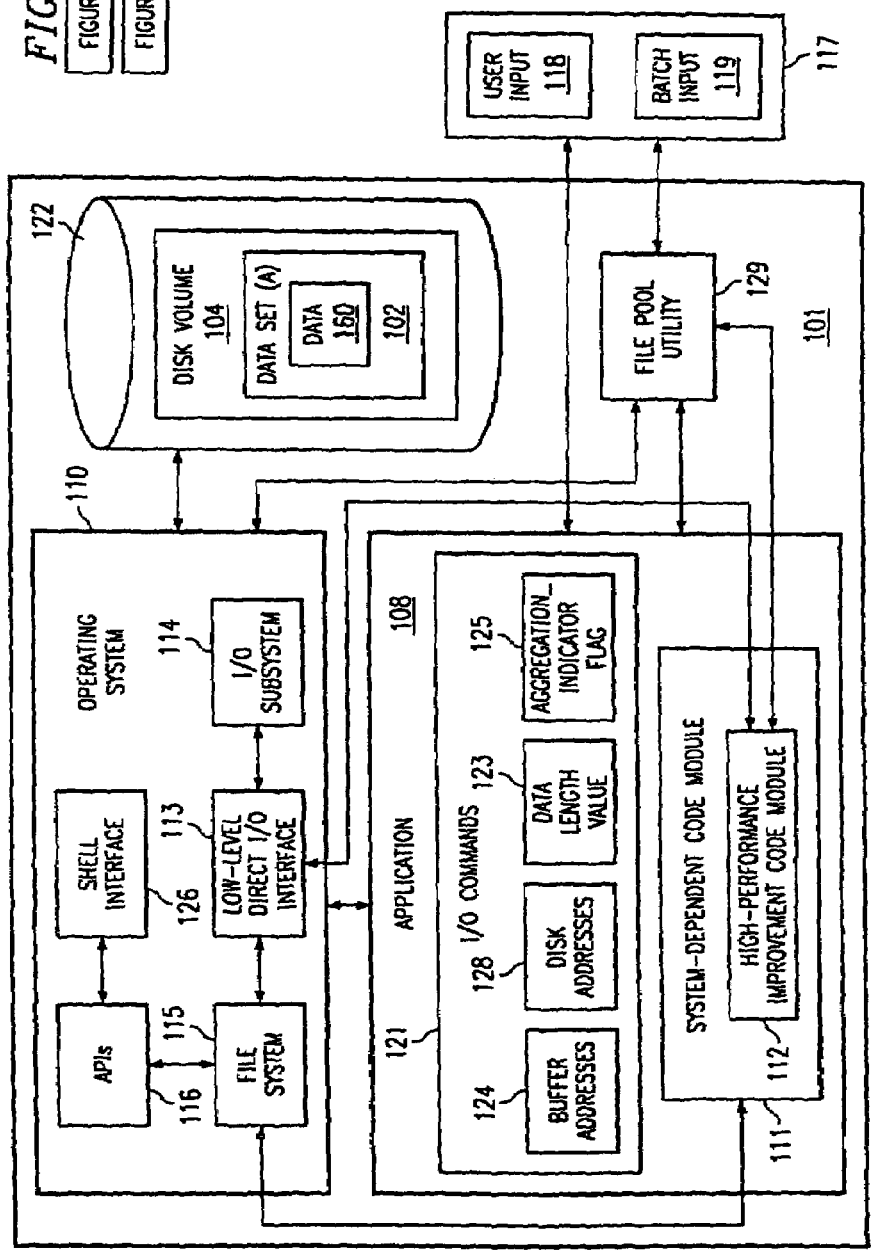

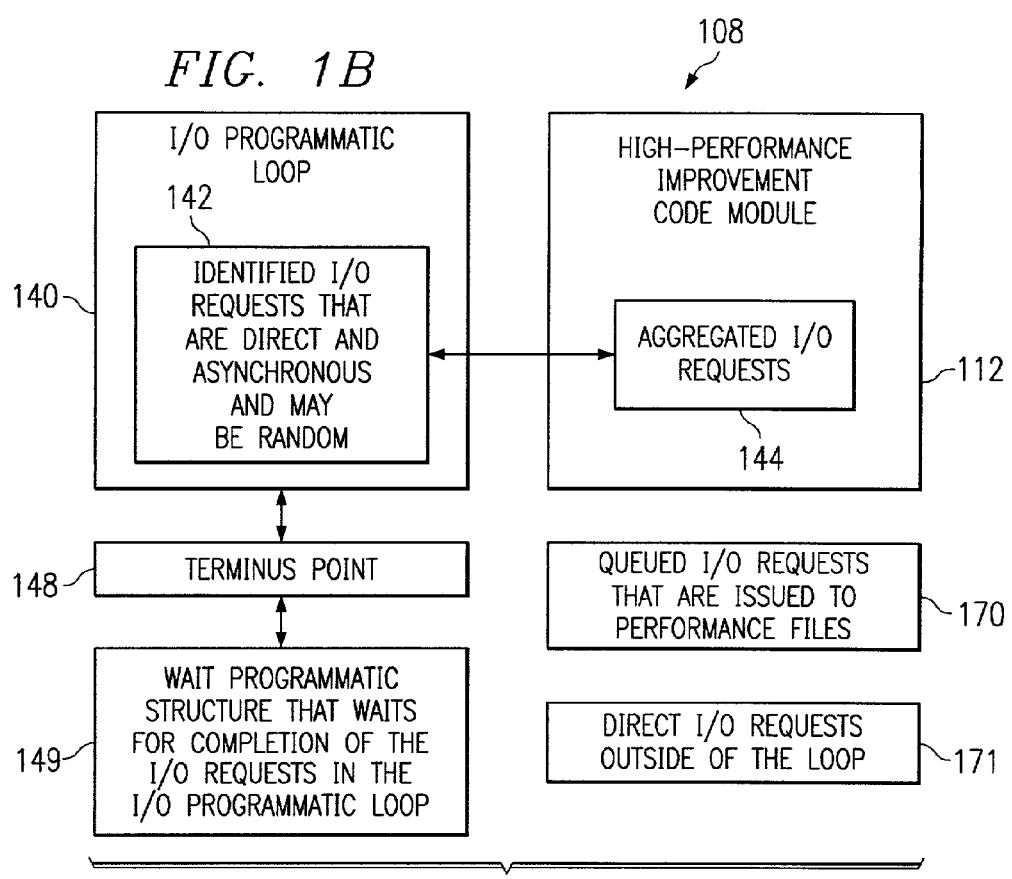
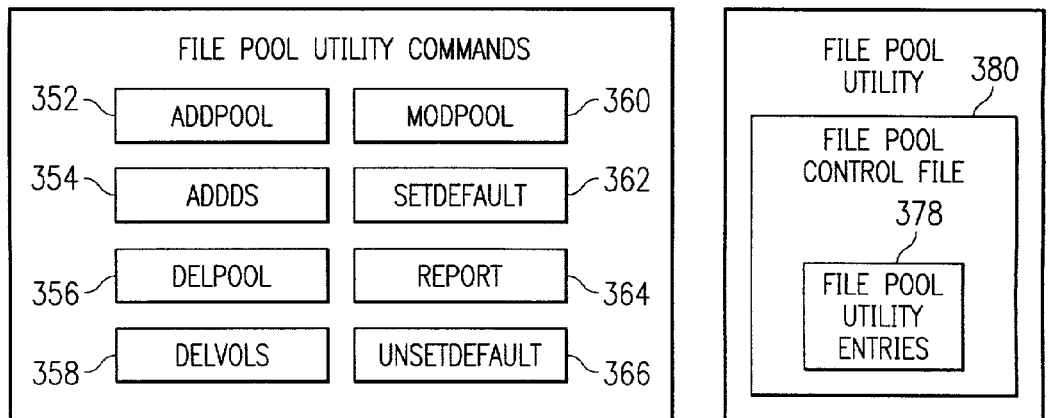

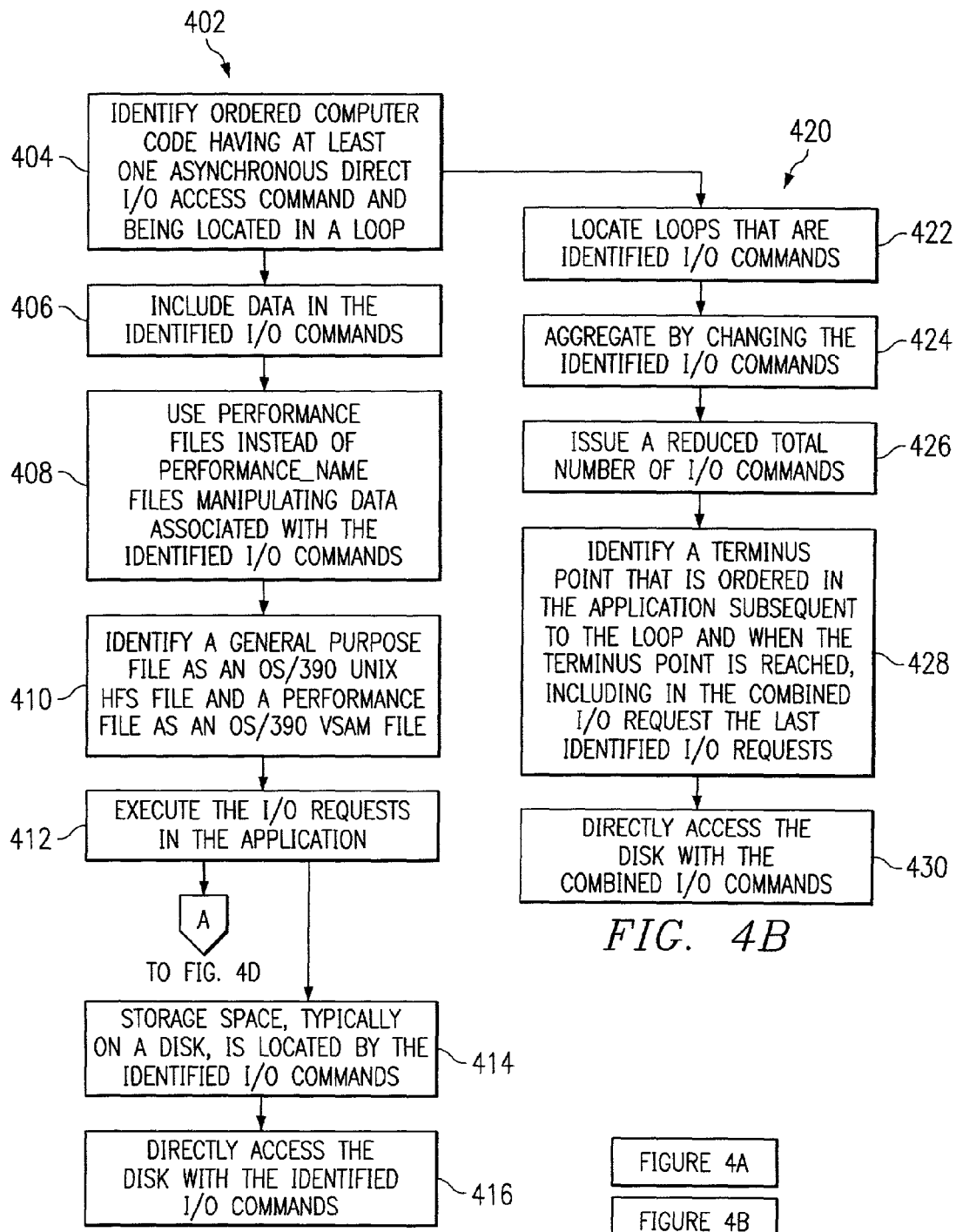

SYSTEMS, METHODS, AND COMPUTER PROGRAM PRODUCTS TO IMPROVE PERFORMANCE OF PORTED APPLICATIONS, SUCH AS A DATABASE, OPERATING ON UNIX SYSTEM SERVICES FOR THE OS/390

CROSS-REFERENCE TO RELATED APPLICATION

In application Ser. No. 10/033,810 now Pat. No. 6,754,734, entitled "Systems, Methods, and Computer Program Products to Improve Performance of Ported Applications, such as a Database," filed on the same date herewith, by William E. Malloy, et al., assigned to the assignee of the present invention, and incorporated herein in its entirety by this reference, there is described a method of bypassing the general-purpose I/O caching features of a computer system in favor of the specialized I/O caching features of the application. Although not limited thereto, the present invention employs such a method in one of its preferred embodiments.

BACKGROUND OF THE INVENTION

1. Field of the Invention

The present invention is directed to the field of accessing an Input/Output (I/O) device, such as a disk volume. It is more particularly directed to improving the performance of computer-implemented I/O operations that are directed to disk drives and that are associated with ported computer applications, such as a database, that operate on the UNIX System Services for the IBM OS/390® (OS/390 UNIX).

2. Description of the Background Art

Typically complex computer applications, such as a database, are ported to a variety of computer systems. The porting process often includes special changes to the application to enable efficient and complete operation of the application on different computer systems. I/O operations are a significant factor in the overall performance of a complex computer application. High-performance computer applications, such as a database, may issue asynchronous, direct disk I/O commands which are not supported on the target system. A "target computer system" as used herein refers to a computer system environment consisting of one or more specific programming languages, the application programming interfaces (APIs) available in the programming languages, and the associated file system or file systems. Therefore, changes to I/O operations may be made during the porting of an application to ensure efficient operation of the application on the computer system. Such a computer system may include the products sold under the trademarks IBM S/390® that includes the IBM OS/390® (OS/390) operating system and associated disk volumes.

Disk volumes are units of data storage that typically include data and the information used to access and manipulate the data. Disk volumes may be used to store a file system and information necessary to manipulate the file system. For example, when implementing database applications that may include disk I/O access commands for operation on the IBM OS/390 that supports UNIX System Services (OS/390 UNIX) the facilities of a hierarchical file system (HFS) may be employed. However, file systems, such as the OS/390 UNIX HFS, may only support queued disk I/O access with minimal I/O caching.

I/O caching is typically managed by either a file system or a disk controller. I/O caching is the process of storing I/O data in computer memory that may be accessed more quickly than the disk device. Therefore, I/O caching may be characterized as temporary storage of data associated with disk I/O requests in computer memory. Complex applications may implement I/O caching for the operation of the application, expecting to bypass the I/O caching facilities of the general-purpose file system.

More particularly general-purpose file systems, such as the OS/390 UNIX HFS, may not have an I/O caching scheme that is tailored to the characteristics of databases. For example, a file system, such as the OS/390 UNIX HFS, may only support queued disk I/O access commands and not direct disk I/O access commands. Queued disk I/O access performs its own I/O caching for proper operation. However, a general-purpose data caching strategy that operates with queued disk I/O access operations may not be optimal for a given application. Therefore an application, such as a database, may perform its own cache management, bypass the file system, and directly access information on a disk. For example, a database may achieve better I/O access performance by using direct I/O access features, available as high-level computer language APIs on many UNIX platforms, in place of queued disk I/O access operations. Also, a database may improve I/O access by managing I/O caching of data instead of relying on the I/O caching scheme of the general-purpose file system.

Queued disk I/O access commands may operate most efficiently with sequential I/O access operations and not random I/O access operations. Highly complex software applications, such as a database, often issue random I/O access requests and the performance of the complex software applications may suffer if I/O requests are serviced by queued disk I/O, which may be designed to optimize sequential rather than random access operations. Therefore, high-performance computer applications, such as a database, may issue direct disk I/O commands that can efficiently process random I/O requests, when accessing disk volumes. If the application being ported is written using asynchronous, direct I/O APIs not supported on the target computer system, which is the case with the OS/390 UNIX C Library and the OS/390 HFS, the performance of the ported application may suffer because those direct I/O commands must be rewritten as queued I/O commands. This may be the case if the computer system is optimized for queued I/O. Those skilled in the art will appreciate the use of sequential I/O and random I/O operations with respect to disk I/O access.

A general-purpose file system may only be able to service I/O requests synchronously. Synchronous I/O operations wait for confirmation that the I/O disk access command has completed before executing another disk I/O access command. The delay in proceeding with subsequent disk I/O access commands impacts application I/O access performance. Asynchronous I/O access commands typically enable other computer operations to proceed that would otherwise wait until the I/O operation successfully completes. This allows I/O operations and other computer operations to overlap and proceed in an asynchronous fashion. Consequently, asynchronous I/O operations perform more efficiently than synchronous disk I/O operations for certain high performance applications, such as a database. Therefore, database software applications suffer performance penalties if they are constrained to use high-level language APIs that do not support asynchronous I/O operations, such as the OS/390 UNIX C Run-time APIs.

In summary, complex applications, such as databases, often include specialized features that ensure that I/O requests are properly sequenced. Typically, these features operate via direct disk I/O operations that facilitate servicing random I/O requests. Therefore, the application code may bypass the I/O caching features of the general-purpose file system in favor of the specialized I/O caching features of the application. When porting the application, limitations of the target computer system may impact the performance of the application. For instance, if a particular UNIX file system supports queued I/O access commands directed to disk volumes and not direct I/O access commands, unacceptably poor I/O access performance for the application may result. Also, if a file system supports synchronous I/O access to disk volumes and not asynchronous I/O access, poor performance for the application may result. Further, a general-purpose file system I/O caching scheme that is optimized for sequential I/O requests may result in poor performance for an application, such as a database, that issues many random I/O requests.

From the foregoing it will be apparent that there is a need to improve disk I/O performance when porting a complex application that uses asynchronous, direct I/O commands to a target computer system that does not support those commands.

SUMMARY OF THE INVENTION

The invention may be implemented as systems, methods, and computer products that improve the performance of computer-implemented I/O operations for complex applications, such as a database, that are ported to computer systems that are not tailored to support the high-performance services that may benefit applications. Complex applications, such as a database, often manage I/O access operations by a caching mechanism that is tailored to the needs of the application. For instance, the application I/O caching mechanism may operate in conjunction with direct disk I/O operations that facilitate servicing random I/O requests. When porting an application to a target computer system that does not support certain I/O access APIs, I/O performance of the application may be limited. For instance, a computer system's high-level language application programming interfaces (APIs) may not support certain I/O access features. The present invention may be implemented by introducing specialized I/O access features that are tailored to enhance I/O access performance for complex applications, such as a database.

For example, the present invention may be implemented so that support for queued disk I/O access commands is augmented with support for direct disk I/O access commands. The augmented support is contingent upon the availability in a computer system of asynchronous, direct I/O access to disk volumes. This augmented support ensures that random I/O requests are handled optimally in addition to sequential I/O requests by an application. The present invention may be implemented on the IBM OS/390 that supports UNIX System Services with the HFS. More particularly, the present invention may augment facilities on the IBM OS/390, such as the high-level language APIs, so that an application that is ported to the IBM OS/390 UNIX System Services will operate more efficiently. OS/390 UNIX provides support for APIs and an interactive shell interface. The OS/390 APIs enable a user or program, such as a database, to request OS/390 services and OS/390 UNIX System Services. The shell interface is an execution environment that services interactive requests from users and batch requests that are included in computer programs, such as a database.

Typically, complex applications that issue direct I/O requests may be associated with an I/O caching mechanism that is managed by the application. When porting the application for use with a general-purpose file system that does not support direct I/O access, I/O performance may be degraded. An implementation of the present invention introduces the use of direct I/O operations with applications ported for operation with general-purpose file systems that do not support direct I/O operations. The direct I/O operations used by the present invention and directed to disk volumes enable faster application I/O operations than queued I/O operations, for certain complex software applications. An implementation of the present invention uses direct I/O operations to support asynchronous I/O access to disk volumes instead of synchronous I/O access to disk volumes, and to optimally process random I/O requests. Therefore, performance of disk I/O access operations that service highly complex software applications, and that are associated with porting the application to a target computer system that does not support direct I/O operations, such as the OS/390 UNIX HFS, is improved by the present invention over past solutions. It will be appreciated that the queued I/O access operations and the direct I/O access operations typically manipulate user data.

In the preferred embodiment of the present invention, the I/O operations that may benefit from the introduced I/O access operations are identified. More particularly, I/O access commands in the application that are within a programmatic loop and that are asynchronous direct I/O commands are identified. That is, the present invention identifies loops in the ordered computer code of the application that generate uninterrupted sequences of asynchronous I/O requests for which the associated waits are not executed until after execution of the loop completes. Such uninterrupted sequences of asynchronous I/O requests are commonly found in loops that are associated with applications that handle buffer flushing. While the preferred embodiment of the present invention operates on I/O access commands that are within a programmatic loop, uninterrupted sequences of asynchronous I/O requests may alternatively be located in other programmatic constructs.

The preferred embodiment then combines, by chaining, the multiple asynchronous direct I/O requests into a much smaller number of disk I/O requests than would otherwise be executed. Those skilled in the art will appreciate that asynchronous I/O requests are typically not followed immediately by a wait request and may be aggressively scheduled for disk I/O operations by techniques such as chaining.

Therefore, the preferred embodiment of the present invention operates most efficiently in a computer system that supports chaining of multiple I/O requests into a single I/O request, such as the OS/390. For example, chained I/O disk requests may be aggregated so that multiple non-contiguous blocks of four thousand ninety-six bytes of information are processed by a single, chained I/O disk request. Execution time for characteristic test loads managed by the present invention is reduced by as much as 60 percent as compared to queued I/O operations on the OS/390 UNIX HFS that does not support combining multiple direct asynchronous I/O requests.

Also, certain queued I/O operations that occur prior to a loop are identified. That is, on UNIX systems a file may be initially opened for queued disk I/O access then closed and reopened for direct disk I/O access. The preferred embodiment of the present invention identifies such queued disk I/O access operations and converts them to direct I/O access operations where appropriate.

The preferred embodiment of the present invention also identifies a terminus point that is located subsequent to the programmatic loop. When the terminus point is reached, any remaining identified asynchronous direct I/O requests currently being aggregated are combined by chaining and the last, possibly partially full, block of chained I/O requests is submitted.

In the preferred embodiment of the present invention, the I/O access requests made by the application which are associated with general-purpose files are replaced with direct I/O commands that are associated with high-performance files that support direct I/O access. Typically, when the application program code is executed, an I/O access request is transmitted to the general-purpose file system. In an embodiment of the present invention, application-directed I/O access of OS/390 UNIX HFS files via queued I/O commands may be redirected for direct I/O access to VSAM files. The general-purpose files may be OS/390 UNIX HFS files and the performance files may be VSAM files. The Virtual Storage Access Method (VSAM) is an access method for direct or sequential processing of fixed-length and varying-length records on disks.

More particularly, an embodiment of the present invention may operate by use of a high-performance improvement code module that accepts lists of buffer addresses and disk addresses, data length values, and aggregation_indicator flags, and issues direct I/O requests instead of queued I/O requests. Without this invention such direct I/O access requests would otherwise be converted to queued I/O requests. For example, on the OS/390 a database application may issue direct I/O access requests during flushing operations in its I/O cache. Transmission of the data associated with the VSAM file may be enabled by use of the buffer address that is the location of the data in computer memory, the disk address that is the location of the data on a disk, the data length value, and the aggregation_indicator flag. Examples of operations that transmit data to and from a file include reading or writing from a file.

Additionally, the preferred embodiment maintains a "performance_name" file that contains the name of the associated high-performance file which can be accessed with direct I/O access commands. For example, the performance_name file may be an OS/390 HFS file that contains the name of an associated VSAM file. Therefore, an association is created between the OS/390 HFS file that would have been used if direct I/O were supported by OS/390 HFS and the VSAM file that is used in its stead. For example, an embodiment of the present invention converts what would otherwise be the queued I/O requests generated during execution of the application code with direct I/O access commands that manipulate the VSAM files by associating the I/O command directed to an OS/390 UNIX HFS file with a direct I/O command to the VSAM file. The performance_name file contains the name of the performance file, here the VSAM file, thereby creating an association between the VSAM file and its companion OS/390 UNIX HFS file by including the name of the VSAM file in the performance_name file.

While on most UNIX platforms general-purpose files support direct I/O access, the target computer system may lack such support. By creating an association between such general-purpose files and the performance files that support direct I/O access commands, database administrators may continue accessing some of the information about the general-purpose files while accessing a disk by direct disk I/O access. Therefore, this reduces the amount of application program code that must be changed to accommodate the code introduced in the preferred embodiment of the present invention. This also maintains ease of use for the application users since the translation between the general-purpose files and the performance files is typically transparent to the user. For example, by relying on the association between the general-purpose files and the performance files, the computer programs that rely on information in OS/390 UNIX HFS files to determine characteristics of a file, such as whether the file exists, do not have to be altered to be made aware of the existence of the VSAM files.

An additional interface is made available for use of the VSAM data sets by a user, such as the system administrator. An embodiment of the present invention includes a file pool utility that enables users, such as a system administrator, to perform tasks that in the past were performed via the use of UNIX System Services. The tasks are now performed via the use of collections of VSAM files, which are referred to as "file pools" herein. For instance tasks that involved the specification of UNIX mount points may now be performed on VSAM files via the file pool utility.

The preferred embodiment of the present invention preformats VSAM data sets that will be used in lieu of OS/390 UNIX HFS files. This enhances performance of disk I/O operations since pre-formatted VSAM data sets are accessed by I/O access commands much faster than unformatted VSAM data sets that must first be formatted before they can be accessed. The terms "VSAM data sets" and "VSAM files" will be used interchangeably herein.

The preferred embodiment also allocates files in single extents. This eliminates the need to add program code to format secondary extents as they are required, and ensures that I/O requests are scheduled with a contiguous disk layout. Scheduling disk I/O requests via single extents that ensure that allocated disk space is contiguous may improve the performance of disk I/O access. An "extent" is a contiguous allocation of storage space, such as disk storage space, to a single database object. This allocation typically consists of multiple pages. A "page" is a unit of storage, such as computer memory, that is smaller than an extent and is four thousand ninety-six bytes on the IBM OS/390. Those skilled in the art will appreciate the use of extents and pages in database operations.

An embodiment of the present invention improves the performance of computer-implemented I/O operations for complex applications, such as a database. More particularly, applications which use asynchronous, direct I/O commands that are ported to target computer systems which do not support such commands may be enhanced by the present invention to improve I/O performance. That is, the present invention may be implemented by augmenting general-purpose I/O access features with specialized I/O access operations that are tailored to enhance I/O access performance for complex applications, such as a database.

Other aspects and advantages of the present invention will become apparent from the following detailed description, taken in conjunction with the accompanying drawings, illustrating by way of an example the principles of the invention.

BRIEF DESCRIPTION OF THE DRAWINGS

FIG. 1A is a block diagram that illustrates the present invention;

FIG. 1B is a block diagram that illustrates the I/O programmatic loop;

FIG. 3B is a block diagram that illustrates the operation of the File Pool Utility;

FIG. 4A is a flow diagram that illustrates operations of the present invention;

FIG. 4B is a flow diagram that illustrates combining asynchronous I/O requests;

In the following detailed description and in the several figures of the drawings, like elements are identified with like reference numerals.

DETAILED DESCRIPTION OF THE INVENTION

Figure 2:
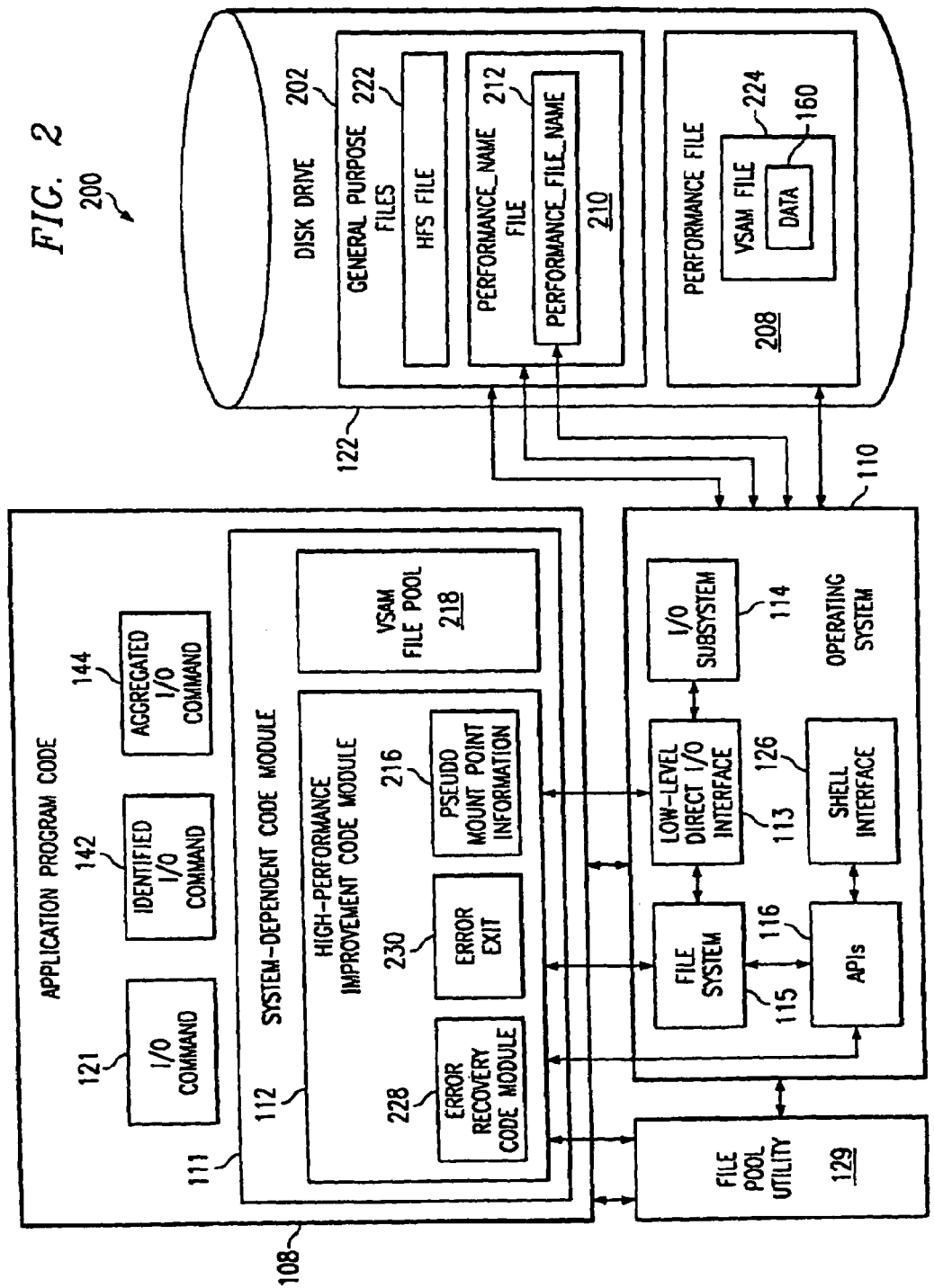
FIG. 2 is a block diagram that illustrates the performance_name file and its association with other components of the present invention.

As shown in the drawings and for purposes of illustration, an embodiment of the invention improves the performance of computer-implemented I/O operations for complex applications, such as a database, that are ported to the environment of a computer system that is not tailored to support the high-performance services used by the applications.

Existing systems may not offer the APIs that provide adequate performance of disk I/O access operations associated with complex computer applications, such as a database, that operate with tailored I/O caching. General-purpose file systems may not provide sufficient facilities, such as the compiler run-time APIs, to accommodate the performance-related features of complex applications. For example, an application-specific I/O caching mechanism may operate in conjunction with direct disk I/O operations that facilitate servicing random I/O requests, but the general-purpose file system may be unable to accommodate the tailored I/O caching mechanism of the application. When porting the application from other UNIX platforms to IBM OS/390 UNIX, which does not take advantage of application I/O caching or support direct disk I/O access, I/O performance of the application may be limited. The present invention may be implemented by substituting I/O access facilities of the IBM OS/390 UNIX HFS with I/O access features that are tailored to enhance I/O access performance for complex applications, such as a database.

For example, complex software that is ported to OS/390 UNIX, such as a database, which uses direct I/O interfaces available in other UNIX environments, will not be able to bypass the inefficient queued I/O access support of the OS/390 UNIX HFS in order to use more efficient direct I/O access operations. The present invention advantageously operates to augment queued I/O access operations with direct I/O access operations. Also, the present invention includes operations associated with a VSAM file pool that provides files for use during I/O access operations and that improves I/O performance associated with complex applications, such as a database.

FIG. 1A is a block diagram that describes the elements of the present invention that improves performance of computer-implemented I/O operations by augmenting I/O access facilities of the OS/390 UNIX general-purpose file system with I/O access features that are tailored to enhance I/O access performance for complex applications, such as a database. Element 101 illustrates a computer system, such as a target computer system, that executes commands according to an embodiment of the present invention. A complex application 108 that is being ported to IBM OS/390 UNIX, such as a database, may incorporate at least three types of I/O access code. The I/O access code may be unmodified and the application 108 may rely on the facilities of a computer system 101, such as an operating system 110. Alternatively, the application 108 may modify the I/O access code for a computer system 101 environment that only supports queued I/O access, such as IBM OS/390 UNIX. Finally, the application 108 may augment general-purpose I/O access operations with customized direct I/O access operations that take advantage of any I/O interfaces that may be provided by the computer system 101 and that may enhance I/O performance of the application 108. It is assumed that a complex application 108 manages serialization of I/O requests 121 in a thread-safe maimer. The present invention optimizes I/O requests 121 for complex applications 108 that have already taken on the burden of managing serialization and have, for the files 102 associated with these I/O requests 121, abandoned the I/O caching scheme typically available via the general-purpose file system 115. Such a general-purpose file system 115 may be optimized to support queued I/O. Those skilled in the art will appreciate that applications 108 developed for operation on other operating systems 110 which support application-level I/O caching and that use direct, asynchronous I/O, will incorporate program code that performs such serialization. More particularly, the present invention may augment facilities on the IBM OS/390, such as the high-level language APIs 116, so that an application that is ported to the IBM OS/390 UNIX System Service Will operated more efficiently. OS/390 UNIX provides support for APIs 116 and an interactive shell interface 126. The terms "I/O request" and "I/O command" will be used interchangeably herein.

Data sets 102, or files, that may be associated with application program code 108, are typically stored by allocating the files 102 to disk volumes 104 that reside on particular disks 122. Applications 108 are generally able to perform I/O access operations to data sets 102 without having much detail about the underlying disk system 122. A complex application 108 that manages its own I/O caching may manage disk I/O directly. More particularly, the present invention performs I/O access operations that access a particular disk volume 104 and data set 102. It will be appreciated that a user interface 117 may include user input 118 or batch input 119 that may be accepted by the application 108 or the file pool utility 129 to manage data sets 102 that will support the use of direct I/O requests 121. A "data set" is a file that is a named set of records that are typically used in a database and that are stored or processed as a unit. The terms "data set" and "file" will be used interchangeably herein.

When a complex application 108, which uses asynchronous, direct I/O commands is ported to a target computer system 101 that does not support those commands, I/O performance may be degraded. Therefore, the high-performance improvement code module 112 advantageously introduces disk I/O access operations that support the tailored I/O operations of the complex application 108. For example, an embodiment of the high-performance improvement code module 112 does not rely on the queued I/O access commands 121 that are typically performed by OS/390 UNIX but introduces support for direct I/O access commands 121 associated with VSAM data sets.

The present invention typically operates in conjunction with an application 108 that includes a system-dependent code module 111 that isolates the features that are specific to the target computer system 101 to facilitate, among other things, the management of I/O access to a disk device 122. That is the application program code 108 may make general requests to the system-dependent code module 111 that translates those requests so that they may be processed by the target computer system 101. Typically the system-dependent code module 111 will pass I/O requests 121 to a general-purpose file system 115. The general-purpose file system 115 may simplify I/O requests 121 for an operating system 110 by providing an interface to read and write user data 160 on a disk 122. This simplifies the translation of I/O requests 121 from the file system 115, such as those from OS/390 UNIX HFS, so that an operating system 110, such as OS/390 UNIX, may communicate with the disk 122.

The system-dependent code module 111 isolates system-specific code to a system-dependent layer. Therefore, when porting a database management tool or other application 108 to another operating system 110, such as porting a database from AIX to OS/390 UNIX, the changes may be isolated to the system-dependent code module 111. It will be appreciated that the present invention may operate without support of the system-dependent code module 111, the low-level direct I/O interface 113, or the I/O subsystem 114 and may interface directly with the disk 122.

The present invention advantageously operates by use of the high-performance improvement code module 112 that introduces support for direct I/O requests 121. For example, OS/390 supports direct I/O requests 121 to files 102 while OS/390 UNIX does not. Therefore applications that are ported from other UNIX platforms to OS/390 UNIX may suffer performance degradation if the applications 108 rely on direct I/O commands 121 for optimal I/O performance. An embodiment of the present invention introduces I/O operations that support direct I/O requests 121 in the absence of such support in the C Run-time Library Interfaces and the underlying OS/390 HFS file system.

Figure 5:
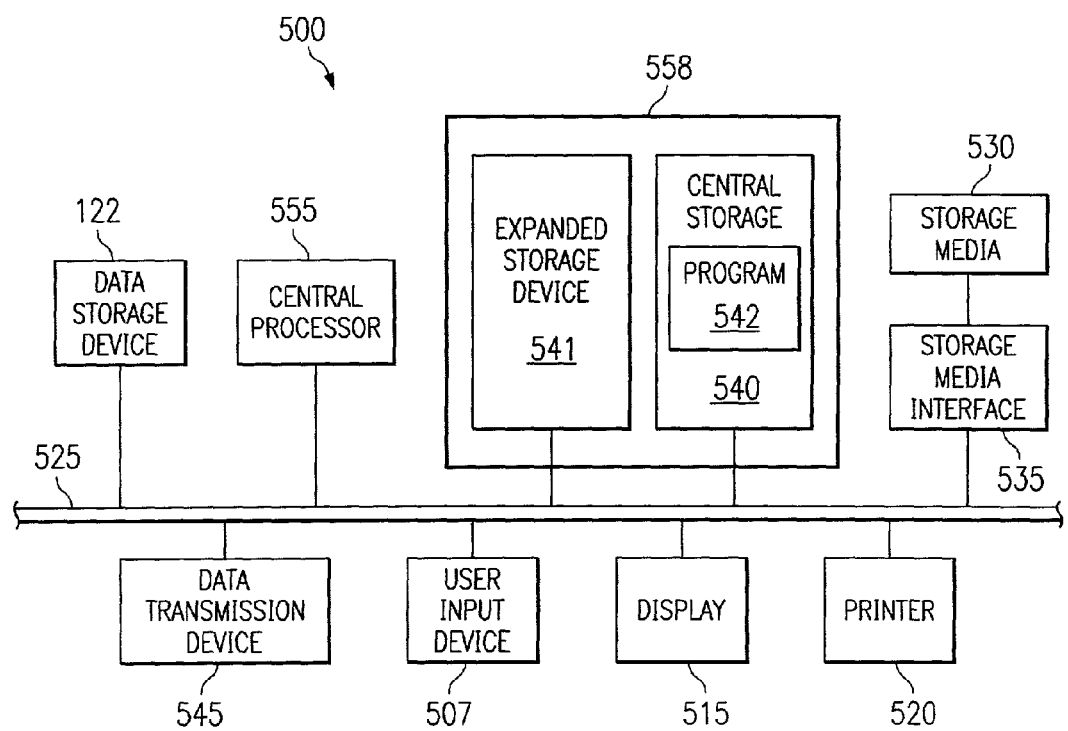
FIG. 5 is a block diagram of a computer system suitably configured for employment of the present invention.

More particularly, the high-performance improvement code module 112 operates as a component of the system-dependent code module 111, which receives I/O requests 121 from the application program code 108. Then the high-performance improvement code module 112 processes buffer addresses 124 and disk addresses 128, data length values 123, and aggregation_indicator flags 125, that are included in the I/O requests 121 of the application 108 and passes aggregated collections of these I/O requests 121 to the low-level direct I/O interface 113. The buffer address 124 is a location identifier for the data 160 while it is stored in computer memory 558 (as shown in FIG. 5). The disk address 128 is a location identifier for the data 160 while it is stored on a disk 122. The data length value 123 indicates the amount of space the data 160 requires. The aggregation_indicator flag 125 indicates that the I/O request 121 for data 160 transmission should be aggregated. More particularly, the high-performance improvement code module 112 passes information to the low-level direct I/O interface 113 that is translated into a form that is suitable for processing by the low-level direct I/O interface 113, and that preserves the high-performance characteristics of the I/O request 121 as generated by the application 108. The low-level direct I/O interface 113 then transmits the I/O requests 121 via the I/O subsystem 114 for transmission of the data 160 to the disk 122.

The preferred embodiment of the present invention changes some features used in disk I/O access. For example, in the system-dependent code module 111, the code responsible for file open and close interfaces now checks for direct I/O file types. Then a file 102 is opened or closed and any other operations necessary to support direct I/O are performed according to the preferred embodiment of the present invention. The preferred embodiment of the present invention employs a file pool utility 129 that provides features for administration of file space that is used by the high-performance improvement code module 112. The file pool utility 129 is accessible from the user interface 117 and interacts with the application 108, the high-performance improvement code module 112, and the low-level direct I/O interface 113.

FIG. 1B illustrates the operations associated the I/O programmatic loop 140. The I/O requests 121 that are included in at least one I/O programmatic loop 140 in the application 108 are located. Any given loop in the application program code 108 is considered an I/O programmatic loop 140 only with respect to a given performance file 208. For each performance file 208 this determination is based on whether a plurality of asynchronous I/O requests 121 are issued to that performance file 208. The present invention is generally described with respect to I/O commands 121 associated with a single performance file 208. However, the invention is able to operate as described herein on multiple performance files 208 concurrently. Element 121 is described with respect to FIG. 1A, and element 208 is described with reference to FIG. 2.

The I/O requests 121 that are direct and asynchronous are located and are the identified I/O requests 142. The preferred embodiment of the present invention operates on uninterrupted sequences of asynchronous I/O requests 121 for which the associated waits are not executed until after the sequence is complete. Such uninterrupted sequences of asynchronous I/O requests 121 are commonly generated by loops that are associated with applications 108, such as databases, that handle buffer flushing. The illustration of FIG. 1B is therefore exemplary, as uninterrupted sequences of asynchronous I/O requests 121 may be located in an I/O programmatic loop 140 or may alternatively be located in other programmatic constructs.

The identified I/O requests 142 are aggregated, in the preferred embodiment of the present invention, into aggregated I/O requests 144. The aggregated I/O requests 144 are manipulated by the high-performance improvement code module 112 so that they may be used in operations that access performance files 208 that are stored on the disk 122. Element 122 is described with reference to FIG. 1A.

The identified I/O requests 142 are asynchronous and may be random, that is, referencing non-contiguous disk 122 locations. Typically complex applications 108, such as databases, issue many random I/O requests 121. The present invention may operate on I/O requests 121 that are either synchronous or asynchronous and that are either random or sequential, although synchronous I/O requests 121 will not be aggregated.

As the execution of the I/O programmatic loop 140 proceeds, I/O requests 121 are bundled into optimal groups which are submitted as single direct I/O requests 121 to the low-level direct I/O interface 113. When processing of the I/O programmatic loop 140 is concluded, a terminus point 148 is reached and any remaining identified I/O requests 142 are aggregated into a final aggregated I/O request 144. Then this final, aggregated I/O request 144 is transmitted to the low-level direct I/O interface 113 for transmission of the data 160 to the disk 122. Then the wait programmatic structure 149 waits for completion of the execution of the identified I/O requests 142 in the I/O programmatic loop 140. Although the preferred embodiment of the present invention operates to intervene in the processing of asynchronous I/O requests 121 in a loop, the waits that are associated with the asynchronous I/O requests 121 may be executed anywhere outside of the I/O programmatic loop 140 and beyond the terminus point 148. Wait processing might, for example, be deferred until the buffer used in the request is actually needed. So, waits might be demand driven rather than operating in a simple loop. Elements 113 and 160 are described with reference to FIG. 1.

Direct I/O requests 121 issued by the application 108 outside of the I/O programmatic loops 171 are passed to the low-level direct I/O interface 113 immediately and without aggregation. I/O programmatic loops 140 must be selected such that queued I/O requests for a performance file 170 are not included in the I/O programmatic loop 140. Outside of the I/O programmatic loops 171 and for a given performance file 208, the performance file 208 may be opened or closed, using standard operating system APIs, 116 for specific types of I/O commands 121. Recall that OS/390 UNIX provides support for APIs 116 and an interactive shell interface 126. In particular, a performance file 208 is often initially opened for queued I/O. Then, following the issuance of a number of queued I/O commands 121, the performance file 208 may be closed for queued I/O, then reopened for direct I/O processing. When a performance file 208 is open for queued I/O, the preferred embodiment of the present invention receives queued I/O commands for a performance file 170, translates them to direct I/O commands 121 that are appropriate for the low-level direct I/O interface 113, passes the translated requests to the low-level direct I/O interface 113, and then waits for the direct I/O commands 121 to complete.

As shown in FIG. 2, and in element 200, an embodiment of the present invention advantageously uses a performance_name file 210 for I/O access operations. The performance_name file 210 creates an association between the general-purpose files 202 that would typically be used to store data 160 and performance files 208 that are used by an embodiment of the present invention. In the preferred embodiment of the present invention, the I/O access commands 121 that are critical to disk I/O access performance are identified. That is, those direct I/O access commands 121 that are associated with performance_name files 210, and that are located within a programmatic loop in the application 108 are identified. Then the identified I/O requests 142 that would otherwise have to be ported as queued I/O requests 121 are redirected to a performance file 208 using direct I/O commands 121. For example, the general-purpose file 202 may be an OS/390 UNIX HFS file 222 and the performance file 208 may be an OS/390 VSAM file 224. The present invention may also aggregate the identified I/O access commands 142 by request chaining. Then the aggregated I/O access commands 144 are directed to the performance file 208 instead of the general-purpose files 202.

The data 160 that would typically be stored on a disk drive 122 in a general-purpose file 202 is now stored on the disk drive 122 in a performance file 208. The preferred embodiment also transforms the general-purpose file 202, which on other computer platforms would contain application data 160, into a performance_name file 210 that contains the name of the performance file 208 that is used to store data 160. Therefore, by creating an association between the general-purpose files 202 and the performance file 208, application administrators may continue accessing the data 160 and the information associated with the general-purpose files 202 via the performance_name file 210 without direct knowledge of the performance file_name 212. Also, characteristics about the performance file 208, such as whether the performance file 208 is in use may be obtained by accessing the performance_name file 210 without requiring the user to have knowledge about the name of the performance file 208.

The high-performance improvement code module 112 operates at the behest of the system-dependent code module 111 to translate I/O requests 121 for the low-level direct I/O interface 113. The high-performance improvement code module 112 includes API features 116 to facilitate its use. It will be noted that I/O requests 121 that are not identified for translation by the high-performance improvement code module 112 are passed from the application 108 to the system-dependent code module 111 and on to the operating system 110 without modification. More specifically, the file system 115 then translates the I/O requests 121 so that they may be passed on to the low-level direct I/O interface 113. The low-level direct I/O interface 113 then passes the I/O requests 121 to the I/O subsystem 114 for transmission to the disk 122.

In an embodiment of the present invention, the application 108 cooperates with the high-performance improvement code module 112 to perform operations that would otherwise rely on UNIX mount point information. That is, the high-performance improvement code module performs operations using "pseudo UNIX mount point information" 216, which is described with respect to VSAM pool of free files 316 and VSAM pool of files in use 318. When an OS/390 UNIX HFS file 222 is created, a VSAM file 224 from the correct VSAM file pool 218 is obtained and the corresponding performance_name file 210 is created. The performance_name file 210 contains a performance_file_name 212, here the name of the VSAM file 224. Therefore, the performance_name file 210 associates the OS/390 UNIX HFS file 222 with a VSAM file 224 that is used to execute direct I/O commands 121. Elements 316 and 318 are described with reference to FIG. 3A.

The preferred embodiment of the present invention attempts to recover from failures that occur as a result of accessing performance files 208. An error recovery code module 228 may be designated as part of the initialization and definition process associated with the high-performance improvement code module 112. The error recovery code module 228 may be driven by any abnormal event and may request a log or a data dump from the operating system 110. An error exit 230 may also be designated in conjunction with the high-performance improvement code module 112 that acquires control in the event of any permanent I/O access errors. Minimally, a report of the occurrence of an error may be provided. Recovery from the error may also be attempted, depending on the type of error.

The embodiment of the present invention also provides other interface features. For example, features such as initialization of asynchronous direct I/O requests 121 maybe provided by the high-performance code module 112 to facilitate manipulation of performance files 208.

Another interface provided by the preferred embodiment of the present invention is the file pool utility 129 that cooperates with the high-performance improvement code module 112 and that creates, deletes, and formats VSAM files 224 in the VSAM file pool 218. The VSAM file pool 218 can be created by taking advantage of facilities that may be included in the target computer system 101 (as shown in FIG. 1A). The VSAM file pool 218 ensures that computer resources will be available as necessary to create VSAM files 224 that are associated with OS/390 UNIX HFS files 222. The VSAM file pool 218 enables file manipulation. For example, when an OS/390 UNIX HFS file 222 is deleted the corresponding VSAM file 224, is marked as free in the VSAM file pool 218. When a VSAM file 224 is marked as free it is reformatted. Since formatting is a time-consuming task, a distinct computer operation, such as an OS/390 UNIX process, may be used to format the VSAM file 224. Using a distinct computer operation allows the application 108 to continue operating without interruption.

Continuing with another example, when an OS/390 UNIX HFS file 222 is renamed, the corresponding VSAM file 224 does not need to be renamed and may continue to be referenced via the performance_name file 210. When a performance_name file 210 is copied, both the performance_name file 210 and the associated VSAM file 224 are created and are associated. All file operations must succeed on both the performance_name file 210 and the associated VSAM file 224 in order to consider the operation successful.

The file pool utility 129 enables a user to access the OS/390 UNIX HFS file 222 location associated with an I/O request 121 and determine whether the HFS file 222 is in use. As a further example, the file pool utility 129 enables a user to generate commands that specify the maximum amount of space to be allocated and the number of VSAM files 224 to be created. More particularly, the preferred embodiment of the file pool utility 129 provides commands that create and allocate VSAM files 224 in named and default VSAM file pools 218 suitable for use with VSAM files 224.

The file pool utility 129 also enables users, such as a system administrator, to perform tasks that in the past were performed via the specification of UNIX mount points. Tasks, such as ascertaining information about storage space allocation for files or use restrictions associated with files, are now performed via the use of VSAM file pools 218. For example, the file pool utility 129 provides OS/390 UNIX users a VSAM interface that may operate in place of the designation of UNIX mount points in OS/390 UNIX. Those skilled in the art will appreciate that use of UNIX mount points enables a user to allocate and manage file space in an HFS. Therefore, UNIX mount points are not used by the preferred invention; rather named collections of VSAM files 224, VSAM file pools 218, are used in conjunction with administrative tasks that correspond to OS/390 UNIX HFS administrative tasks.

Figure 3A:
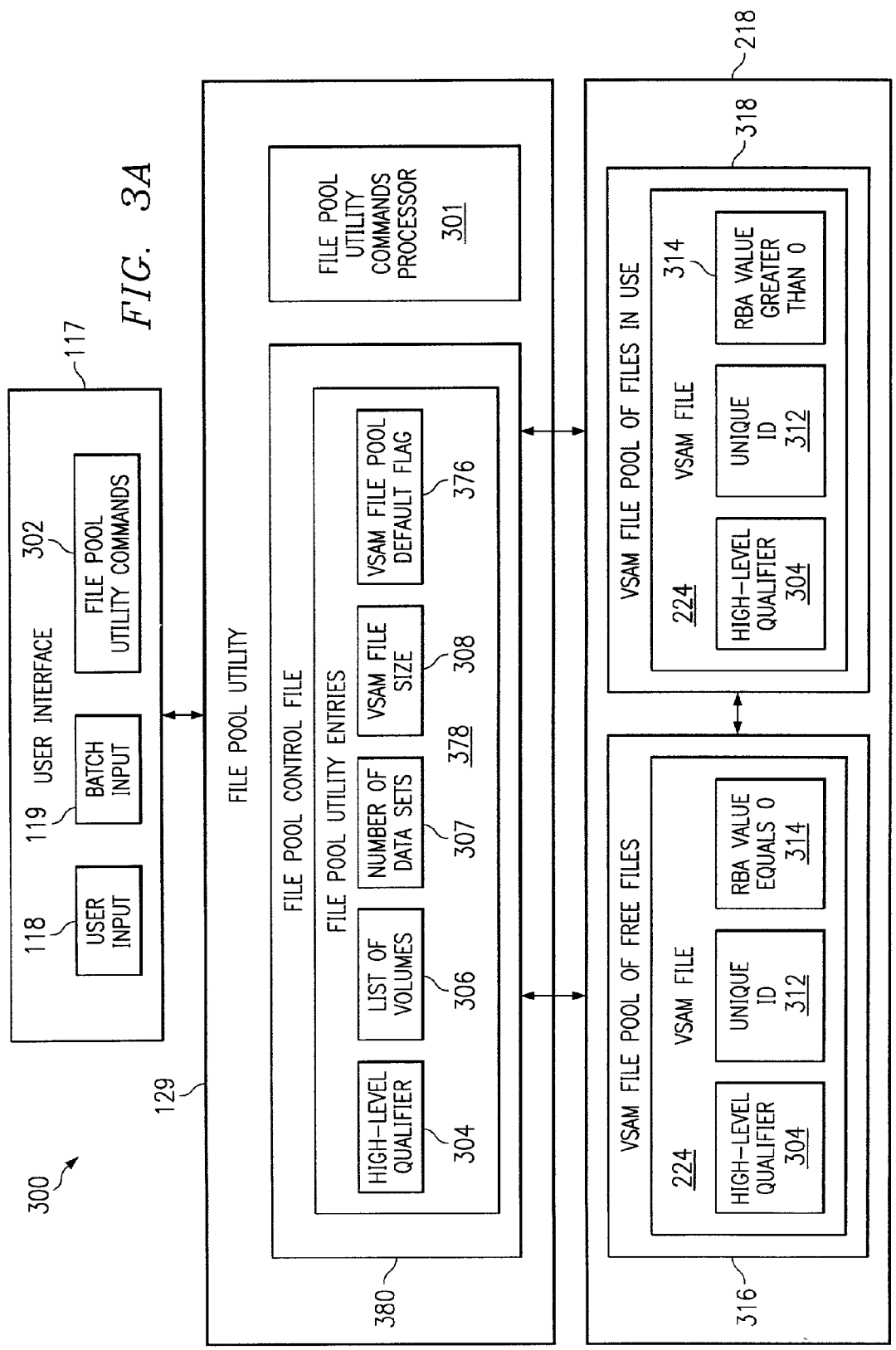
FIG. 3A is a block diagram that illustrates the operation of the VSAM file pool.

FIG. 3 illustrates the operations associated with the VSAM file pool 218, as shown in FIGS. 3A and 3B. FIG. 3A is a block diagram that illustrates the VSAM file pool 218. FIG. 3B is a block diagram that illustrates the operations of the file pool utility 129.

As shown in FIG. 3A, and in element 300, the operations associated with the VSAM file pool 218 and its relationship to VSAM data sets 224 are described. Before being able to write to a VSAM data set 224 it must be formatted. Because formatting is a time-consuming operation, the present invention creates a VSAM file pool 218 of pre-formatted VSAM data sets 224 that may be used as needed. The user interface 117 may include a set of file pool utility commands 302 that facilitate use of the file pool utility 129 by the user interface 117. The VSAM file pool 218 may be created by the file pool utility 129 that takes file pool utility commands 302 as input, either via user input 118 or batch input 119. The file pool utility commands 302 are described with reference to FIG. 3B. The file pool utility includes a file pool utility command processor 301 that processes the file pool utility commands 302. Element 218 is described with reference to FIG. 2.

A file pool entry 378 is included within a file pool control file 380. The file pool utility entries 378 are maintained and controlled in the file pool control file 380. The file pool entry 378 includes: a high-level qualifier 304, a list of disk volumes 306, the number of data sets 307 in the VSAM file pool 218, a data set size value 308, and a VSAM file pool default flag 376. The high-level qualifier 304 may be used as the name of the VSAM file pool 218. The high-level qualifier 304 may also be used as part of the names of the VSAM files 224. Preceding the creation of the VSAM file pool 218 the user chooses at least one high-level qualifier 304 and also sets aside a set of disk volumes 104 (as shown in FIG. 1A). The list of volumes 306 indicates the disk volumes 104 that are associated with the VSAM file pool 218. The list of volumes 306 may be provided by the System Managed Storage Facility found on the IBM S/390®. The VSAM file size 308 that may be referred to as the, "data set size value" indicates the maximum capacity of VSAM files 224 to create in the VSAM file pool 218. The VSAM file pool default flag 376 indicates whether the VSAM file pool 218 is a default file pool.

The file pool utility 129 can create pre-formatted VSAM files 224 in response to a command to add a VSAM file 224 to the VSAM file pool 218. For example, the names of VSAM files 224 may be created in the following format: "a high-level qualifier 304 and a unique identifier 312." The high-level qualifier 304 represents user-chosen characters. The unique identifier 312 suffix may be dynamically derived in the form "xnnnnnnn," where "x" is a letter and "n" is a digit. Unique and dynamically derived names, such as the unique identifier 312, may be created by use of a time-of-day clock, such as the one found on the IBM S/390®. The time-of-day clock provides values on the IBM S/390® that are guaranteed to be unique. It will be appreciated by those skilled in the art that the creation of unique identifiers may be accomplished in many different ways without departing from the present invention.

According to the preferred embodiment of the present invention, when the VSAM files 224 are created and formatted the high-used RBA value 314 is set to zero by the file pool utility 129. OS/390 maintains a file catalog that includes a value that is associated with each VSAM data set 224 and that indicates the relative address, the high-used RBA 314, that is the highest displacement of data 160 (as shown in FIG. 1A) within the VSAM data set 224.

It will be appreciated by those skilled in the art that the high-level qualifier 304 must conform to OS/390 data set qualifier conventions, since it becomes part of an OS/390 data set name. Other formats for the high-level qualifiers may be used without departing from the present invention. There are two kinds of high-level qualifiers, a high-level qualifier 304 with a default value or one with a mount point value. The high-level qualifier 304 enables determination of the location of VSAM files 224 that may be accessed by direct I/O operations. The mount point as used in UNIX systems specifies a root directory for a file system 115. In the preferred embodiment of the present invention the high-level qualifier 304 with a mount point value can be used to designate a certain group of VSAM files 224 from which a particular instance of the application 108 (as shown in FIG. 1A) may locate free VSAM files 224. Further, the high-level qualifier 304 with a default value can be used to designate a default group of VSAM files 224. Those skilled in the art will appreciate the use of the location of the root of a file system 115.

When an application 108 needs a VSAM file 224, it searches for one in the VSAM file pool of free files 316. In the preferred embodiment this search is performed by determining whether a VSAM file 224 exists whose high-level qualifier matches the VSAM file pool 218 name, either a default or a specific name, and whose high-used RBA value 314 is zero. When a VSAM file 224 is found in the VSAM file pool of free files 316 the RBA value 314 is set to a value greater than zero to indicate that the VSAM file 224 is now in use. When an application 108 no longer needs it, the VSAM file 224 is reformatted and the RBA value 314 is set to zero, thus marking the availability of the VSAM file 208.

As shown in FIG. 3B, the file pool utility 129 provides functionality to an application 108 administrator to use resources associated with VSAM files 224. The file pool utility commands 302 as described in Table 1 below are used in the preferred embodiment of the present invention.

The file pool entries 378 are included in the file pool control file 380. The ADDPOOL command 352 creates a file pool entry 378. The ADDDS command 354 attempts to create the maximum number of VSAM files 224 specified by the ADDPOOL command 352 on the designated disk volumes 104. The DELPOOL command 356 deletes the free VSAM files 224 in the VSAM file pool 218, and, if there are no VSAM files 224 in use, deletes the file pool entry 378. The DELVOLS command 358 deletes the free VSAM files 224 that are associated with the VSAM file pool 218 on the specified disk volumes 104, and removes these disk volumes 104 from the volume list associated with the file pool utility entry 378. The MODPOOL command 360 modifies the number of VSAM files 224 that are in a VSAM file pool 218. The SETDEFAULT command 362 indicates that a particular VSAM file pool 218 is the default VSAM file pool 218. Therefore, the VSAM file pool 218 is used when no mount points are specified by an application 108 requesting space. The REPORT command 364 produces a list of the VSAM files 224 associated with a VSAM file pool 218 and that are free or in use. The same information may be provided for all of the VSAM file pools 218. The UNSETDEFAULT command 366 removes the default set by the SETDEFAULT command 362. If no default VSAM file pool 218 has been designated, an application 108 request for a file 202 (as shown in FIG. 2) which does not specify a particular VSAM file pool 218 will fail.

TABLE I

The File Pool Commands

| Commands | Parameters |
|---|---|
| ADDPOOL creates a file pool table entry, and associates a list of disk volumes with that entry. | (1) High-level qualifier and unique identifier (2) VSAM file size (3) List of Disk Volumes (4) Number of VSAM files to be created |
| ADDDS creates as many VSAM files as possible on the designated disk volumes, up to the number specified by the ADDPOOL command. | (1) Identifier for the VSAM file pool (2) List of Disk Volumes |
| DELPOOL deletes the free VSAM files in the VSAM file pool and removes any reference to the VSAM files from the file pool control file, if none of the VSAM files are in use. | (1) VSAM file pool identifier |
| If no VSAM files are in use on the specified volumes, DELVOLS deletes the free VSAM files that are associated with the VSAM file pool and removes the specified volumes from the volume list in the file pool entry. | (1) VSAM file pool identifier (2) List of Disk Volumes |
| MODPOOL modifies the number of VSAM files that are in a VSAM file pool. | (1) VSAM file pool identifier (2) Number of VSAM files in the VSAM File Free Pool |
| SETDEFAULT indicates that a particular VSAM file pool is the default VSAM file pool. | (1) VSAM file pool identifier |
| REPORT produces a list of the VSAM files associated with a VSAM file pool and that are free or in use. | (1) VSAM file pool identifier or "ALL" |
| UNSETDEFAULT removes the default set by the SETDEFAULT command. | No parameters |

In the preferred embodiment of the present invention, file pool utility entries 378 in the file pool utility 129 are protected from casual or unintended modification. The protection may be accomplished via simple encryption. Because encryption is used to protect the entries 378 associated with the file pool utility 129, the REPORT command 364 provides a means to view a listing of the values associated with these entries 378.

Figure 4C:
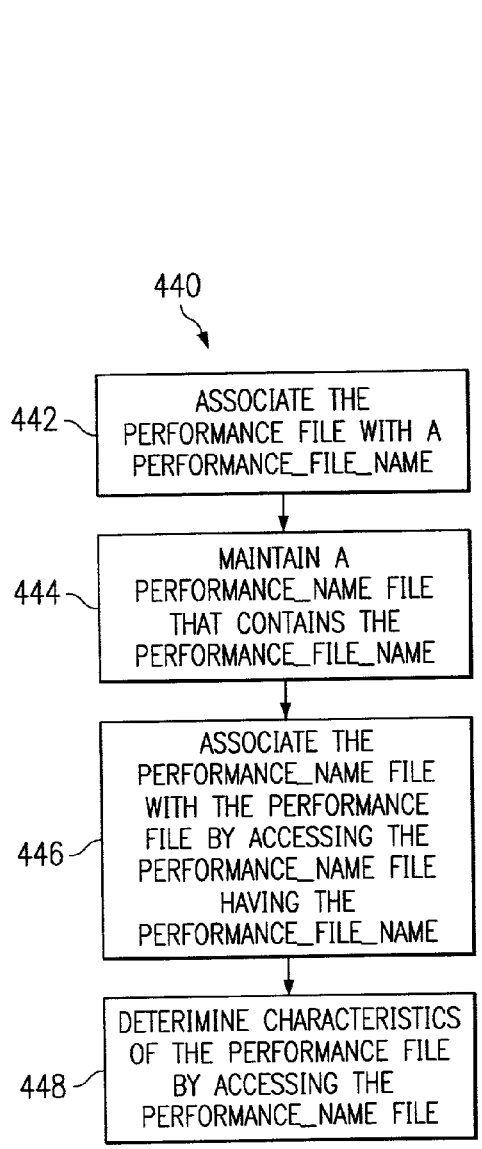
FIG. 4C is a flow diagram that illustrates the operations associated with the performance_name file.
Figure 4D:
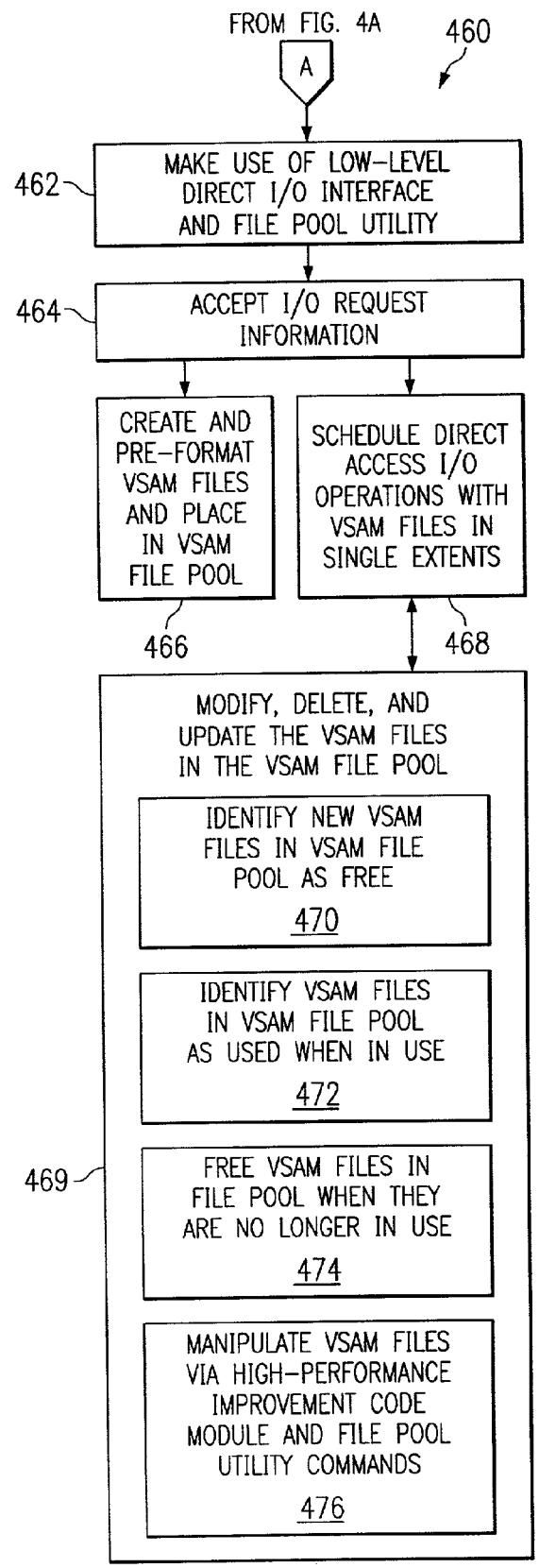
FIG. 4D is a flow diagram that illustrates the operations of the VSAM file pool.

FIG. 4 describes the method of the present invention as shown in FIGS. 4A, 4B, 4C, and 4D. FIG. 4A is a flow diagram that illustrates the present invention. FIG. 4B is a flow diagram that illustrates combining asynchronous I/O requests. FIG. 4C is a flow diagram that illustrates the operations associated with the performance_name file 210. FIG. 4D is a flow diagram that illustrates the operations of the VSAM file pool 218. Elements 210 and 218 are described with reference to FIG. 2.

As shown in FIG. 4A, and in the element 402, the I/O access operations associated with the present invention are described. As shown in element 404, the preferred embodiment of the present invention identifies the ordered computer code having at least one asynchronous direct I/O access command 121 and being located in a programmatic loop 140. An embodiment of the present invention determines files 102 that may benefit from direct disk I/O access operations 121 by identifying filename suffixes that are typically accessed directly. Those skilled in the art will appreciate that this is one method of determining files 102 that may benefit from direct disk I/O access and that other methods may be used. Elements 102 and 121 are described with reference to FIG. 1A and element 140 is described with reference to FIG. 1B.

The preferred embodiment of the present invention includes data 160 that is associated with the identified I/O commands 142, as shown in element 406. Then as shown in element 408, performance files 208 are used instead of performance_name files 210 to access and store the data 160 that is associated with the identified I/O commands 142. For example and as shown in element 410, the performance_name file 210 may be an OS/390 UNIX HFS file 222 and the performance file 208 may be an OS/390 VSAM file 224. Elements 202, 208, 210, 222, and 224 are described with reference to FIG. 2, and elements 160 and 142 are described with reference to FIG. 1.

As shown in element 412 the preferred embodiment executes the I/O requests 121 in the application 108. During execution of the I/O requests 121 operations associated with FIG. 4D may occur. Then as shown in element 414, storage space, typically on a disk 122, is located by the identified I/O commands 142. As shown in element 416, the disk 122 is directly accessed with the identified I/O commands 142. Elements 108 and 122 are described with reference to FIG. 1A.

As shown in FIG. 4B, and in element 420, the method of the present invention advantageously exploits the performance characteristics of disks 122 that perform I/O operations faster when given fewer I/O requests 121. That is as shown in element 422, loops are processed in the application program code 108, such as database code, in which a plurality of identified I/O requests 142 are executed. It will be appreciated that the functions described with respect to element 404 in FIG. 4A may be used to locate the identified I/O requests 142. The loops are likely to appear in most database applications in the areas of the computer code that are responsible for moving data 160 from the cache memory 558 (as shown in FIG. 5) to the disk 122.

Then the present invention combines the identified I/O requests 142 into a much smaller number of aggregated I/O requests 144 (as shown in FIG. 1B) than would otherwise be executed, as shown in element 424. It will be appreciated that asynchronous I/O requests 121 are typically issued before previous I/O requests 121 have completed. For example, asynchronous I/O requests 121 are typically not followed by a wait request and may be aggressively scheduled for disk I/O operations. Therefore, the present invention takes advantage of the asynchronous I/O requests 121 to combine the identified I/O requests 142. Then as shown in element 426, a reduced total number of disk I/O requests 121 are issued.

The preferred embodiment of the present invention identifies a terminus point 148 that is ordered in the application subsequent to the I/O programmatic loop 140 (as shown in FIG. 1B). When the terminus point 148 is reached, the last identified I/O requests 142 are included in the last aggregated I/O request 144, as shown in element 428. Then an embodiment of the present invention uses direct I/O instead of queued I/O to access the disk 122 with the aggregated I/O commands 144, as shown in element 430.

As shown in FIG. 4C, and in element 440, the method of the association between the performance_name file 210 and the performance file 208 is described. A performance_file_name 212 that is associated with a performance file 208 is identified, as shown in element 442. The preferred embodiment maintains a performance_name file 210 that contains the performance file_name 212 associated with the performance file 208, as shown in element 444. Therefore, the performance_name files 210 are associated with the performance file 208 by accessing the performance_name file 210 having the performance_file_name 212, as shown in element 446. Characteristics of the performance file 208 are determined by accessing the performance_name file 212, as shown in element 448. This applies to file manipulation functions such as "copy," "rename," and "delete," as well as to lower-level routines that schedule I/O requests 121 and process wait requests. Elements 210 and 212 are described with reference to FIG. 2.

As shown in FIG. 4D and element 460, the preferred embodiment of the present invention manages the use of VSAM files 224. The operations associated with FIG. 4D occur after the application 108 has started to execute, as shown in FIG. 4A and element 412. As shown in element 462 the preferred embodiment of the present invention makes use of the low-level direct I/O interface 113 and the File Pool Utility 129. The file pool utility 129 enables a user to manipulate the VSAM files 224 and therefore use augmented operations for those that would have been performed on the OS/390 UNIX HFS files 222. The low-level direct I/O interface 113 provides a set of system services that can be taken advantage of by the high-performance improvement code module 112 (as shown in FIG. 1A).

As shown in element 464, an embodiment of the present invention accepts information about the data 160 that is required for processing an I/O request 121. For instance, an I/O request 121 typically includes a buffer address 124, a data length value 123, and a disk address 128. Also, an aggregation_indicator flag 125 is included so that the completion of an I/O request operation may be determined. That is, the preferred embodiment of the present invention assumes that I/O requests 121 are asynchronous and therefore provides a mechanism for signaling I/O completion to the application 108. Elements 123, 124, 125, and 128 are described with reference to FIG. 1A.

As shown in element 466, the preferred embodiment of the present invention creates and pre-formats VSAM files 224, associating the pre-formatted VSAM files 224 with the VSAM file pool 218. This enhances performance of disk I/O operations since pre-formatted VSAM files 224 are accessed by I/O access commands 121 much faster than unformatted VSAM files 224 that must first be formatted before they can be accessed. Element 218 is described with reference to FIG. 2

The file pool utility 129 also allocates VSAM files 224 in single extents, as shown in element 468. This eliminates the need to add program code to format secondary extents as they are required, and ensures that I/O requests 121 that reference contiguous locations within a VSAM file 224 reference contiguous disk locations. If the application 108 creates new files 102 as needed rather than growing existing files when a file size limit is reached, the preferred method will fit well. For example, the preferred method works well on systems with very large files 102. In such an environment the space savings realized by using secondary extents is not significant, particularly when balanced against execution-time costs. Therefore, scheduling disk I/O requests via single extents that ensure that allocated disk space is contiguous may improve the performance of disk I/O access. Since database applications typically create very large files 102, the space saving benefits of using file extents is minimized.

As shown in element 469, the preferred embodiment of the present invention modifies, deletes, and updates the VSAM Files 224 in the VSAM file pool 218. As shown in element 470, the new VSAM files 224 are identified as free in the VSAM file pool 218. Also, the VSAM files 224 in the VSAM file pool 218 are identified as used when they are in use, as shown in element 472. When a VSAM file 224 that was in use is no longer needed it is marked as free, as shown in element 474. Also as shown in element 476, the VSAM files 224 are manipulated via the high-performance improvement code module 112 and the file pool utility commands 302.

FIG. 5 is a block diagram of an exemplary computer system 500, suitable for employment of the present invention. The computer system 500 may be implemented on a general-purpose computer, such as the IBM System/390, or other conventional minicomputer, work-station, or graphics computer devices. In its preferred embodiment, the computer system 500 includes a user-input device 507, a display 515, a printer 520, a central processor 555, a memory 558, a data storage device 122, such as a hard drive, an expanded storage 541, a central storage 540, storage media 530, a storage media interface 535, a data transmission device 545, all of which are coupled to a bus 525 or other communication means for communicating information. The central storage 540 is directly addressable by the central processor 555. The expanded storage 541 may be used to relieve the central storage 540 when it is heavily utilized. Although the system 500 is represented herein as a standalone system, it is not limited to such, but instead can be part of a networked system. For example, the exemplary computer system 500 may be connected locally or remotely to fixed or removable data storage devices 122 and data transmission devices 545. For another example, the exemplary computer system 500, such as the target computer system 101 (as shown in FIG. 1A), also could be connected to each other and to other computer systems via the data transmission device 545.

The central storage 540, the expanded storage 541, and the data storage device 122 are storage components that store data 160 (as shown in FIG. 1A) and instructions for controlling the operation of the central processor 555, which may be configured as a single processor or as a plurality of processors. The central processor 555 executes a program 542 to perform the methods of the present invention, as described herein. Before processing occurs, a program 542 and its data 160 must reside in central storage 540. Input/Output operations result in the transfer of information between the central storage 540 and the user-input device 507.

While the program 542 is indicated as loaded into the memory 548, it may be configured on storage media 530 for subsequent loading into the data storage device 122 or the memory 558 via an appropriate storage media interface 535. Storage media 530 can be any conventional storage media such as a magnetic tape or an optical storage media. Alternatively, storage media 530 can be another type of electronic storage, located on a remote storage system.

Generally, the computer programs 542 and operating systems 110 (as shown in FIG. 1A) are all tangibly embodied in a computer-readable device or media, such as the memory 558, the data storage device 122, or the data transmission devices 545, thereby making an article of manufacture, such as a computer program product, according to the invention. As such, the terms "computer program product" as used herein are intended to encompass a computer program accessible from any computer-readable device or media.

Moreover, the computer programs 542 and operating systems 110 are comprised of instructions which, when read and executed by the exemplary computer system 500, such as the target computer system 101, perform the steps necessary to implement and use the present invention. Under control of the operating system 110, the computer programs 542 may be loaded from the memory 558, the data storage device 122, or the data transmission devices 545 into the memory 558 of the exemplary computer system 500, such as the target computer system 100.

The user-input device 607 is a device, such as a keyboard or speech recognition subsystem, for enabling a user to communicate information and command selections to the central processor 555. The user can observe information generated by the system 500 via the display 515 or the printer 520. The user-input device 507 may also be a mouse, track-ball, or joy stick, that allows the user to manipulate a cursor on the display 515 for communicating additional information and command selections to the central processor 555.

When operating in accordance with one embodiment of the present invention, the exemplary computer system 500 augments general-purpose I/O commands with specialized I/O access features that are tailored to enhance I/O access performance for computer applications 108, such as a database. The central processor 555 and the program 542 collectively operate to improve the performance of I/O disk access. It will be appreciated that the present invention offers many advantages over prior art techniques.

The present invention is typically implemented using one or more computer programs, each of which executes under the control of an operating system 110 and causes the exemplary computer system 500, such as the computer system 101, to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims

TRADEMARKS

IBM is a trademark or registered trademark of International Business Machines Corporation in the United States and other countries.

S/390 is a trademark or registered trademark of International Business Machines Corporation in the United States and other countries.

OS/390 is a trademark or registered trademark of International Business Machines Corporation in the United States and other countries.

AIX is a trademark or registered trademark of International Business Machines Corporation in the United States and other countries.

UNIX is a trademark or registered trademark of Unix System Laboratories, Inc.

We claim:

1. A computer-implemented method for bypassing I/O operations of a file system included in said computer, comprising:
    including in said computer an operating system having application programming interfaces and a shell interface;
    ordering computer code that includes I/O access commands in an application;
    when said file system is optimized for processing queued I/O access commands that are a type of said I/O operations:
        locating asynchronous direct said I/O access commands that are included in said application ordered computer code; and
        bypassing said queued I/O access commands when porting said application from said operating system to a different operating system by executing said asynchronous direct I/O access commands by use of said application programming interfaces and said shell interface.

2. The computer-implemented method of claim 1, further comprising bypassing said queued I/O access commands by use of a performance file.

3. A computer-implemented method for aggregating asynchronous direct I/O access commands, comprising:
including in said computer an operating system having application programming interfaces and a shell interface;
ordering computer code that includes I/O access commands in an application that does I/O caching;
supporting I/O request chaining in said computer that includes a file system;
when said file system is optimized for processing queued I/O access commands:
associating asynchronous direct I/O access commands with at least one file in said file system;
associating said at least one file with at least one performance file;
chaining said asynchronous direct I/O access commands into at least one aggregated I/O access command in said computer program application;
associating said at least one aggregated I/O access command with said at least one performance file;
identifying a terminus point in said ordered computer code;
issuing said at least one aggregated I/O access command by use of said application programming interfaces and said shell interface until said terminus point is reached; and
when said terminus point is reached and if said at least one aggregated I/O command remains, issuing a final said at least one aggregated I/O access command.

4. The computer-implemented method of claim 3, further comprising:
including data in said asynchronous direct I/O access commands; and
including said data in said at least one aggregated I/O access command.

5. The computer-implemented method of claim 3, further comprising allocating said performance file in single extents.

6. The computer-implemented method of claim 3, further comprising pre-formatting said performance file.

7. The computer-implemented method of claim 3, further comprising allocating said performance file in a named performance file pool.

8. The computer-implemented method of claim 7, further comprising marking said performance file in said performance file pool as free.

9. The computer-implemented method of claim 7, further comprising marking said performance file in said performance file pool as used.

10. The computer-implemented method of claim 3, further comprising allocating said performance file in a default performance file pool.

11. The computer-implemented method of claim 10, further comprising marking said performance file in said default performance file pool as free.

12. The computer-implemented method of claim 10, further comprising marking said performance file in said default performance file pool as used.

13. The computer-implemented method of claim 3, further comprising manipulating said performance file by a file pool utility.

14. The computer-implemented method of claim 3, further comprising recovering from errors occurring while executing said at least one aggregated I/O access command.

15. The computer-implemented method of claim 3, further comprising locating said asynchronous direct I/O access commands in a loop in said ordered computer code.

16. A computer system for bypassing I/O operations of a file system included in said computer system, comprising:
an operating system having application programming interfaces and a shell interface;
ordered computer code that includes I/O access commands in an application;
when said file system is optimized for processing queued said I/O access commands that are a type of said I/O operations:
asynchronous direct I/O access commands that are included in said application ordered computer code; and
said queued I/O access commands that are bypassed when said application is ported from said operating system to a different operating system by executing said asynchronous direct I/O access commands by use of said application programming interfaces and said shell interface.

17. The computer system of claim 16, further comprising said queued I/O access commands that are bypassed by use of a performance file.

18. A computer system for aggregating asynchronous direct I/O access commands, comprising:
an operating system having application programming interfaces and a shell interface;
ordered computer code that includes I/O access commands in an application that does I/O caching;
a file system;
when said file system is optimized for processing queued I/O access commands;
asynchronous direct I/O access commands that are associated with at least one file in said file system;
said at least one file that is associated with at least one performance file;
said asynchronous direct I/O access commands that are chained into at least one aggregated I/O access command in said computer program application;
a terminus point in said ordered computer code;
said at least one aggregated I/O access command that is associated with said at least one performance file and that is issued until said terminus point is reached; and
when said terminus point is reached and if said at least one aggregated I/O command remains, a final said at least one aggregated I/O access command.

19. The computer system of claim 18, further comprising:
data that is included in said asynchronous direct I/O access commands; and
said data that is included in said at least one aggregated I/O access command.

20. The computer system of claim 18, further comprising said performance file that is allocated in single extents.

21. The computer system of claim 18, further comprising said performance file that is a pre-formatted file.

22. The computer system of claim 18, further comprising said performance file that is allocated in a named performance file pool.

23. The computer system of claim 22, further comprising said performance file that is marked in said named performance file pool as free.

24. The computer system of claim 22, further comprising said performance file that is marked in said named performance file pool as used.

25. The computer system of claim 18, further comprising said performance file that is allocated in a default performance file pool.

26. The computer system of claim 25, further comprising said performance file that is marked in said default performance file pool as free.

27. The computer system of claim 25, further comprising said performance file that is marked in said default performance file pool as used.

28. The computer system of claim 18, further comprising said performance file that is manipulated by a file pool utility.

29. The computer system of claim 18, further comprising said at least one aggregated I/O access command that recovers from errors.

30. The computer system of claim 18, further comprising said asynchronous direct I/O access commands that are located in a loop in said ordered computer code.

31. An article of manufacture comprising a program storage medium readable by a computer and embodying one or more instructions executed by said computer for bypassing I/O operations of a file system included in said computer, wherein said article of manufacture is operable to:
  include in said computer an operating system having application programming interfaces and a shell interface;
  order computer code that includes I/O access commands in an application;
  when said file system is optimized for processing queued I/O access commands that are a type of said I/O operations:
    locate asynchronous direct I/O access commands in said application ordered computer code; and
    bypass said queued I/O access commands when porting said application from said operating system to a different operating system by executing said asynchronous direct I/O access commands by use of said application programming interfaces and said shell interface.

32. The article of manufacture of claim 31, further operable to bypass said queued I/O access commands by use of a performance file.

33. An article of manufacture comprising a program storage medium readable by a computer and embodying one or more instructions executed by said computer for aggregating asynchronous direct I/O access commands, wherein said article of manufacture is operable to:
  include in said computer an operating system having application programming interfaces and a shell interface;
  order computer code that includes I/O access commands in an application that does I/O caching;
  support I/O request chaining in said computer that includes a file system;
  when said file system is optimized for processing queued I/O access commands:
    associate said asynchronous direct I/O access commands with at least one file in said file system;
    associate said at least one file with at least one performance file;
    chain said asynchronous direct I/O access commands into at least one aggregated I/O access command in said computer program application;
    associate said at least one aggregated I/O access command with said at least one performance file;
    identify a terminus point in said ordered computer code;
    issue said at least one aggregated I/O access command by use of said application programming interfaces and said shell interface until said terminus point is reached; and
    when said terminus point is reached and if said at least one aggregated I/O command remains, issue a final said at least one aggregated I/O access command.

* * * * *